United States Patent
Satou et al.

(10) Patent No.: US 6,971,367 B2
(45) Date of Patent: Dec. 6, 2005

(54) FUEL CONTROL SYSTEM AND METHOD OF ENGINE

(75) Inventors: Shinya Satou, Hitachi (JP); Shinji Nakagawa, Hitachinaka (JP); Toshio Hori, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/372,818

(22) Filed: Feb. 26, 2003

(65) Prior Publication Data

US 2004/0016419 A1    Jan. 29, 2004

(30) Foreign Application Priority Data

Jul. 26, 2002 (JP) .............................. 2002-217419

(51) Int. Cl.[7] ............................................. F02D 41/10
(52) U.S. Cl. ...................... 123/350; 123/492
(58) Field of Search ................. 123/350, 492, 123/493, 478, 480

(56) References Cited

U.S. PATENT DOCUMENTS 5,829,254 A * 11/1998 Hayashi et al. ............... 60/602

FOREIGN PATENT DOCUMENTS

| JP | 10274070 | 10/1988 | |
|---|---|---|---|
| JP | 10047114 | 2/1998 | |
| JP | 10089140 | 4/1998 | |
| JP | 01313636 | 12/1999 | |
| JP | 2000-97080 A | * 4/2000 | ........... F02D 41/10 |
| JP | 2000248978 | 9/2000 | |
| JP | 2001082197 | 3/2001 | |

* cited by examiner

Primary Examiner—Andrew M. Dolinar
(74) Attorney, Agent, or Firm—Crowell & Moring LLP

(57) ABSTRACT

In a system which applies a torque-based control to a direct injection engine with a turbocharger and is capable of switching between stoichiometric running and lean-burn running in accordance with a driving state, in order to provide a means for obtaining preferred exhaust performance and driveability, a turbo lag index is computed on the basis of supercharged pressure information or air intake pipe pressure information which are obtained directly or indirectly, and then a throttle opening or a fuel injection quantity is corrected on the basis of the above-described turbo lag index to obtain desired torque and exhaust characteristics. As a result, it is possible to prevent a torque variation, a change in torque characteristics, exhaust deterioration, or the like in a transient time, which are generated due to a turbo lag.

13 Claims, 10 Drawing Sheets

FUEL CONTROL SYSTEM AND METHOD OF ENGINE

BACKGROUND OF THE INVENTION

1. Field of the Invention

The present invention relates to a control system of a gasoline engine for an automobile, and particularly to a control system of an engine with a supercharger.

2. Description of the Prior Art

With respect to a current gasoline engine system for an automobile, there are many kinds of engine bodies and engine controls for controlling the engine bodies, in correspondence with diversified needs.

As one type of the engine body, in addition to a general type of natural air intake engine in which the air is taken into a cylinder by utilizing a negative pressure generated when a piston moves down, an engine with a supercharger in which the air is forced into the cylinder by utilizing the supercharger to effect high output has been came into practical use. As a typical supercharger, there are a mechanical supercharger as shown in JP-A-10-274070 and a turbocharger as shown in JP-A-2001-82197. The former utilizes shaft output of an engine to drive a compressor, while the latter utilizes exhaust gas of an engine for the same purpose. At present, the mainstream of the supercharger is the turbocharger having a high energy efficiency.

As further type of the engine body, a cylinder injection engine in which the fuel is directly injected into a cylinder as shown in JP-A-10-47114 has been practically used, in stead of a conventional engine in which the fuel is injected into an air intake port. In the direct injection engine, ultra-lean-burn driving can be performed to improve fuel consumption due to reduction in a pump loss. Also, as shown in JP-A-2000-248978, if the direct injection engine and the turbocharger are combined together, it is possible to further increase the amount of an intake air even when the throttle has been fully opened, which results in an advantage of expanding a lean-burn area toward a high load side in comparison to the natural air intake engine. In addition, in the lean-burn driving, an exhaust gas quantity is substantially increased in comparison to the natural air intake engine so that the number of revolution of a turbine is increased, therefore it can be expected to improve a response of generating torque in correspondence with accelerator operation.

On the other hand, with respect to an engine control, a so-called torque-based (torque demand) control is practically used as a new logic engine control. The backgrounds of its development is: this control is essential in the above-described lean-burn system for reducing a torque variation generated when normal burn driving (hereafter referred to as stoichiometric driving) in which A/F is approximately 14.7 and lean-burn driving are switched; a torque required to an engine from outside thereof is increased, as shown in a traction control, and thus a processing part therefor is required; and an electrically controlled throttle as is a key device has been practically used. As a concrete control content, a target engine torque is set by comprehensively considering an idle requirement torque and an external requirement torque for a car body control and the like, as well as an accelerator operation of a driver, and a fuel injection quantity and an intake air quantity are controlled to achieve the target engine torque. Because the engine torque is largely dependent on the fuel injection quantity, a fuel control is important for achieving the target engine torque, while it is an essential requirement to match an air-fuel ratio to its desired value from the viewpoint of high efficiency utilization of a catalyst for cleaning exhaust gas. Thus, in this control, the compatibility of control accuracies of the fuel control and the air-fuel ratio control is important.

There are two types of methods proposed as torque-based controls, which are different from each other depending on determination ways of a fuel injection quantity. One type is an air leading (air precedence) type in which a fuel injection quantity is determined after a real intake air quantity is measured as shown in JP-A-10-89140, and the other type is a fuel leading (fuel precedence) type in which a fuel injection quantity is directly determined on the basis of a result of computing a target torque as shown in JP-A-1-313636.

In the air leading type of control, a target air quantity is computed on the basis of a result of computing a target torque, and then a target throttle opening is transmitted to an electrically controlled throttle in order to achieve the target air quantity. After a real air quantity taken into a cylinder according to the target throttle opening is measured with an air flow sensor or the like, a fuel injection quantity is determined on the basis of the real air quantity and a target air-fuel ratio. In this method, because the fuel injection quantity is determined on the basis of the real air quantity, the method is characterized in that an accuracy of the air-fuel ratio is ensured. However, because the fuel injection quantity, with which a torque is determined, is determined via the air quantity, a generated torque may be largely out of the target torque depending on an accuracy of the air quantity control.

On the other hand, in the case of the fuel leading type of control, a target fuel injection quantity and a target air quantity are determined to obtain a desired air-fuel ratio on the basis of a result of computing a target torque, and then the corresponding signals are transmitted to an injector and an electrically controlled throttle respectively. Therefore, there is a disadvantage that if both the fuel injection quantity and the air quantity are not achieved to be equal to their target values, a desired air-fuel ratio is not obtained. In particular, regarding the intake air quantity, it is difficult to match the real air quantity with the target air quantity, therefore an improvement in the accuracy of the air quantity control is a large problem. However, it is characteristic that an accuracy of the torque control is high, because the result of target torque computation is directly reflected in the fuel injection quantity.

BRIEF SUMMARY OF THE INVENTION

Accordingly, a system combining the above described several technologies, that is, a system which applies a torque-based control to a direct injection engine with a turbocharger and can switch stoichiometric driving and lean-burn driving in accordance with driving states is promising in view of improvement in fuel consumption, output, drivability, and the like.

However, in the case of the engine with the turbocharger, under a drive condition in which a throttle is rapidly opened such as in acceleration, it takes some time until the turbine revolution number increases because of inertial of the turbine, which causes a phenomenon in which it takes a certain time until a supercharging pressure reaches to its target value, that is, causes a turbo lag. This occurs remarkably in acceleration from a low revolution and low load area in which an exhaust gas quantity is small, so that the supercharging pressure can not follow the target quantity, which results in a state that the real air quantity does not temporarily reach the target air quantity. Due to the phenomenon, in the system in which the torque-based control is employed in the direct injection engine with the turbocharger, the following problems is likely to occur.

If the fuel leading type of torque-based control is employed, assuming that an intake air quantity is controlled to be its target value as described above, a fuel injection quantity is determined without obtaining information about an intake air quantity. Thus, in a state that a real air quantity does not temporarily reach a target air quantity, for example, in occurrence of a turbo lag, the fuel becomes relatively excessive and exhaust gas deteriorates. To address the problem, it seems effective to apply a transient correction (in which a quantity of fuel is reduced in accordance with phase of the air) to a fuel injection quantity by detecting or predicting occurrence of the turbo lag in order to prevent the fuel excess.

In addition, in the system in which the stoichiometric driving and the lean-burn driving can be switched in accordance with the driving states, it should be noted that a degree of the turbo lag varies in accordance with driving modes. That is, in the lean-burn driving, because a ratio of an intake air quantity to a fuel injection quantity is large and an exhaust gas quantity is also large, the turbine revolution number remains high even in a low revolution and low load area, so that a turbo lag is relatively small. Therefore, not only in the air leading type of torque-based control but also in the fuel leading type of torque-based control in which the fuel injection quantity is corrected (reduced) to prevent fuel excess by detecting or predicting occurrence of the above-described turbo lag, an accelerator response is preferable in the lean-burn driving in which the turbo lag is small, while the accelerator response is slow in the stoichiometric driving in which the turbo lag is large, so that a problem of making a driver feel uncomfortable occurs.

In addition, in the time of burning-switching for switching the stoichiometric driving and the lean-burn driving, the following problem occurs due to a turbo lag. Because a fuel quantity required for generating the same torque is different in the stoichiometric driving and in the lean-burn driving, a fuel correction is required in the time of switching. The fuel correction quantity depends primarily on pump loss, and the pump loss in the case of a turbo engine depends on not only a throttle opening but also a supercharging pressure. Therefore, in a transient time when the supercharging pressure continuously changes due to the turbo lag, the pump loss also changes continuously, and thus the fuel correction quantity is also required to be continuously changed correspondingly. However, in the prior art corresponding to a natural air intake engine such as shown in JP-A-10-47114, because the fuel correction quantity is set in consideration of only a steady driving state in which the pump loss remains constant, the fuel correction quantity is unsuitable in occurrence of the turbo lag so that there is a problem of resulting in a torque variation.

The present invention is provided in light of the above-described problems, and an object of the present invention is to prevent a torque variation, a change in torque characteristic, exhaust deterioration, or the like in a transient time, which occur due to a turbo lag, in a system in which a torque-base control is employed in a direct injection engine with a turbocharger and in which stoichiometric driving and lean-burn driving can be switched in accordance with driving states.

To achieve the object, according to the present invention, there are provided a fuel control apparatus of an engine and a method of controlling the fuel of the engine, in which a turbo lag index is computed on the basis of supercharging pressure information or air intake tube pressure information obtained directly or indirectly, so that a throttle opening or a fuel injection quantity is corrected on the basis of the above-described turbo lag index in order to obtain desired torque and exhaust characteristics.

Other objects, features, and advantages of the present invention will be apparent from description of embodiments of the present invention described below in reference to the accompanying drawing.

Now, the present invention will be described in detail in reference to the embodiments thereof.

DETAILED DESCRIPTION OF THE INVENTION

Figure 1:
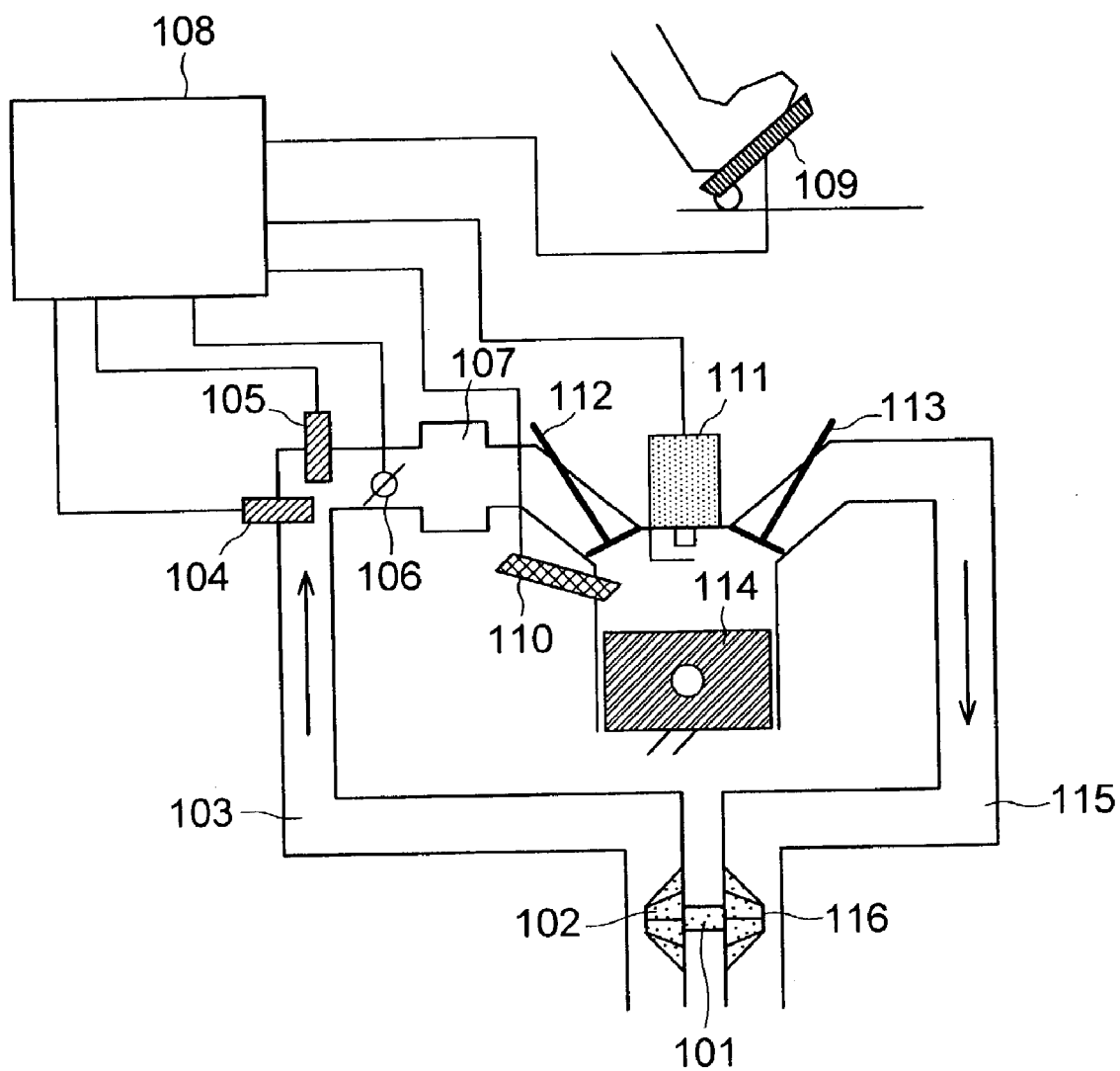
FIG. 1 is a view showing a hard configuration of an ultra-lean-burn type of turbo supercharging engine system according to a first embodiment.
Figure 2:
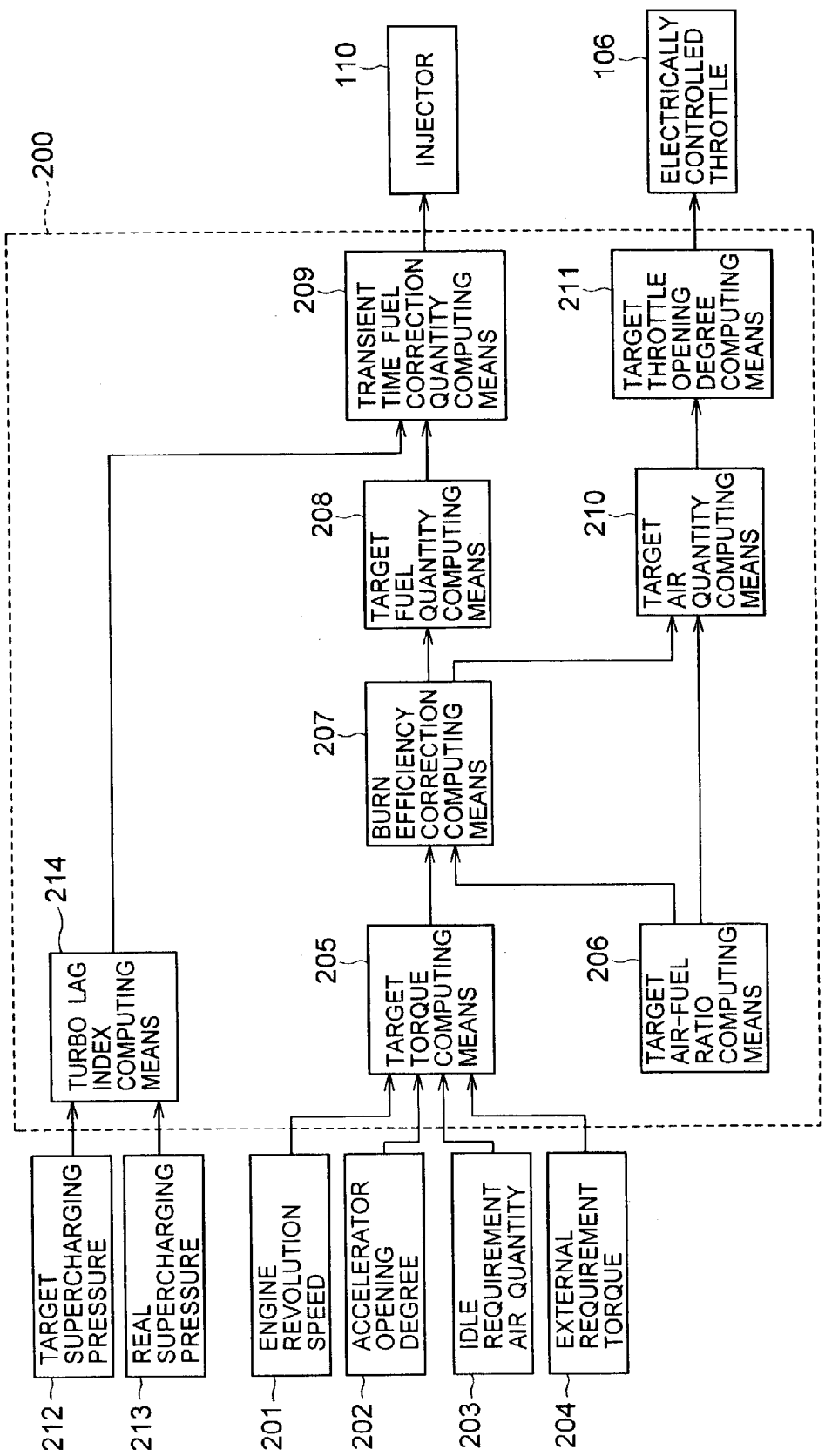
FIG. 2 is a control block diagram of a fuel leading type of torque-based control for a turbo engine according to the first embodiment.

FIG. 1 is a view showing a hard configuration of a turbo supercharged engine system capable of ultra-lean-burn driving of a first embodiment according to the invention, and FIG. 2 is a control block diagram of a fuel leading type of torque-based control 200 corresponding to the system. First, in reference to FIG. 1, the hard configuration of the turbo supercharged engine system will be described. Fresh air supercharged by a compressor 102 which is a part of a turbocharger 101 is introduced through an air intake pipe 103 to an inlet side of an electrically controlled throttle 106. In this process, a supercharged pressure and an air quantity of the fresh air are measured by a supercharged pressure sensor 104 and an air flow sensor 105 located in the air intake pipe, and are transmitted to an ECU 108. For the electrically controlled throttle 106, a throttle opening degree is determined in accordance with a signal computed by the ECU 108 on the basis of information about an opening degree of an accelerator pedal 109 or the like, and then a fresh air quantity introduced into an intake manifold 107 is regulated in accordance with the throttle opening degree. The fresh air in the manifold is introduced into a cylinder from a point of time at which a piston 114 is moved down and an air intake valve 112 is opened, so that the fresh air is mixed with fuel mist injected by an injector 110 provided in the cylinder to form a mixed gas. A quantity and timing of the fuel injection is determined in accordance with a signal transmitted from the ECU 108 to the injector 110, wherein in the case that the fuel injection is performed during an air intake process, homogeneous combustion is generated, while in the case that the injection is performed during a compression process, stratified combustion which allows ultra-lean-burn is generated. Thereafter, the air intake valve 112 is closed, and the mixed gas compressed in a process of moving the piston 114 up is ignited with an ignition plug 111 at a point just before a compression top dead center and expanded rapidly so as to push the piston 114 down, thereby a driving torque is generated. Thereafter, an exhaust process begins at a point of time at which the piston 114 is moved up and an exhaust valve 113 is opened, so that exhaust gas is introduced to an exhaust pipe 115. The turbocharger 101 is mounted on the exhaust pipe 115, so that a turbine 116 which is a part of the turbocharger 101 is rotated when the exhaust gas passes through the turbocharger 101. The turbine 116 is coaxial to the above-described compressor 102, and the compressor 102 is rotated in synchronization with rotation of the turbine 116. Thus, the present system is a system utilizing energy of the exhaust gas to rotate the turbine 116 and thus the compressor 102 directly coupled thereto in order to obtain a supercharging effect. Accordingly, the supercharging effect is dependent on an exhaust gas quantity.

Now, in reference to FIG. 2, control block contents of the fuel leading torque-based control 200 will be described. In target torque computing means 205, which is a starting point, a base target torque (reference target torque) is calculated on the basis of an accelerator opening degree 202 signal, an engine revolution speed 201, and an idle requirement air quantity 203, and then a final target torque is computed by also considering an external requirement torque 204 signal, such as a cruise control, a traction control, or the like. The computed result is transmitted to a combustion efficiency correction computing means 207 in which a correction is applied to the result in accordance with a fuel consumption efficiency amount (which is mainly dependent on a pump loss) on the basis of a target air-fuel ratio computed by a target air-fuel ratio computing means 206. This corrected target torque value is transmitted to a target fuel quantity computing means 208 which is a fuel control system, and a target air quantity computing means 210 which is an air control system. In the target fuel quantity computing means 208, a target fuel quantity is computed for the target torque, thereafter a transient time correction is performed by a transient time fuel correction quantity computing means 209. Here, the correction is applied to the target fuel quantity on the basis of a turbo lag index computed by a turbo lag index computing means 214 as described below, and a pulse signal corresponding to the final target fuel quantity is transmitted to the injector 110. On the other hand, in the target air quantity computing means 210, a target air quantity is computed in consideration of the target torque and the target air-fuel ratio, and then on the basis of the computed results, a target throttle opening degree is computed by a target throttle opening degree computing means 211 to transmit a corresponding signal to the electrically controlled throttle 106.

Now, the turbo lag index computing means 214 and the transient time fuel correction quantity computing means 209, which are newly provided so as to correspond to a turbo engine and are important control blocks in the present invention, will be described. An object of these control blocks is to prevent the air-fuel ratio from being rich during acceleration and prevent a torque variation generated in switching between stoichiometric driving and lean driving, which are generated due to a turbo lag.

A specific computing content in the turbo lag index computing means 214 is as follows:

Turbo lag index=Supercharged pressure sensor output value/Target supercharged pressure That is, in a steady condition, the turbo lag index is approximately 1, while in the case of a turbo lag occurrence condition, the index is calculated to be a value closer to 0 as a degree of the lag increases. On the basis of the turbo lag index, the transient time fuel correction quantity computing means 209 determines fuel correction quantities at a time of acceleration and burning-switching. Specific fuel correction contents at a time of the acceleration will be described in reference to FIG. 3.

Figure 3:
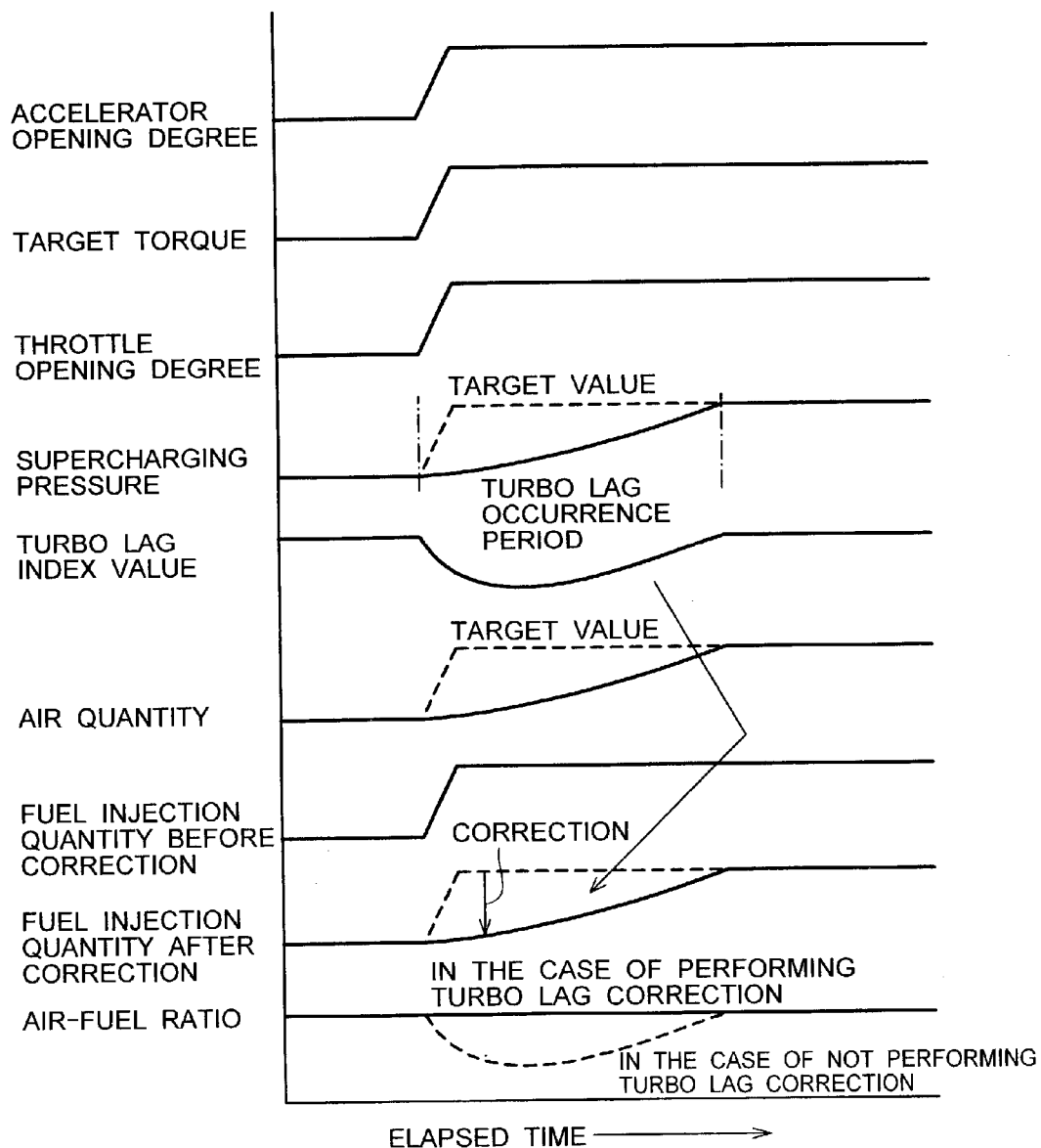
FIG. 3 is a schematic view of behaviors of control parameters in accordance with elapse of the time in rapid acceleration according to the first embodiment.

FIG. 3 is a view schematically showing behaviors of control parameters over time, at a time of rapid acceleration of a turbo engine employing the fuel leading torque-based control 200 explained in reference to FIGS. 1 and 2 described above. First, if a driver sharply pushes down an accelerator pedal from an area where the accelerator opening degree 202 is small, the accelerator opening degree 202 signal correspondingly increases generally in steps. Next, in accordance with the change in the accelerator opening degree 202, a target torque, a target throttle opening degree, a target supercharging pressure 212, a target air quantity, and a target fuel injection quantity (before the transient time correction) is correspondingly change in steps. Although it is necessary to control an air-fuel ratio to remain in a constant value even in this transient state, the air-fuel ratio is likely to become richer due to phenomena described below. In the case of the acceleration in the area where the accelerator opening degree 202 is small as shown in FIG. 3, since an exhaust gas quantity is small, it takes some time until the supercharging pressure reaches the target supercharging pressure 212, that is, so-called turbo lag occurs, which results in an intake air quantity being substantially smaller than its target value in this period. On the other hand, a fuel injection quantity becomes relatively excessive from the viewpoint of the exhaust gas if the above-described target fuel injection quantity (before the transient time correction) is used, because the fuel injection quantity is nearly equal to its target value regardless of whether the turbo lag occurs or not. To correct the fuel quantity, in the transient time fuel correction quantity computing means 209, a behavior of the intake air quantity is estimated on the basis of the turbo lag index obtained from the turbo lag index computing means 214 to correct the fuel injection quantity in the transient time so that the fuel injection quantity has the same ratio as the intake air quantity. As a result, the air-fuel ratio remains constant even in the transient area in which the turbo lag occurs, which can prevent exhaust deterioration due to reduction in a catalyst cleaning efficiency.

Figure 4:
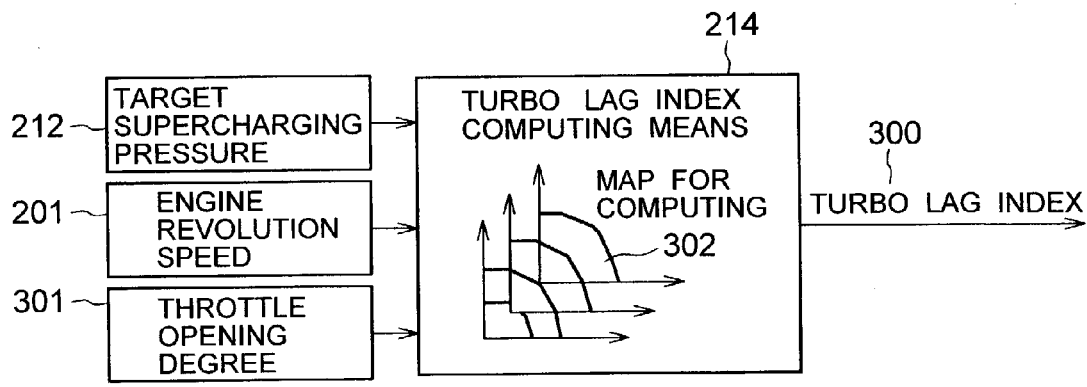
FIG. 4 is a view showing contents of turbo lag index computing means according to a second embodiment.

Now, a second embodiment according to the present invention will be illustrated in FIG. 4. While a turbo lag index 300 is calculated using the supercharging sensor 104 in the first embodiment described above, in the second embodiment, supercharged pressure information is indirectly determined using other parameters deeply associated with the supercharging pressure. As specific parameters, a throttle opening degree 301 or an accelerator opening degree 202, an engine revolution speed 201, an intake air quantity, a target torque, a base fuel quantity, or the like are included. In this embodiment, the throttle opening degree 301 and the engine revolution speed 201 are employed. Specifically, by considering a tendency that the smaller the engine revolution speed 201 is and the larger a change amount of the throttle opening degree 301 is, the larger a deviation between a target supercharging pressure 212 and a real supercharging pressure 213 is in a transient manner, the turbo lag index 300 is taken in a turbo lag index computing map 302 in which change quantities of the engine revolution and the throttle opening degree 301 are used as arguments. In controlling, the supercharged pressure information is estimated by searching the map on the basis of the change quantities of the engine revolution and the throttle opening degree 301 to compute the turbo lag index 300, thereby fuel optimization is performed by the transient time fuel correction quantity computing means 209. Therefore, there is no need to provide the supercharging pressure sensor 104, so that cost reduction in the system is achieved.

Figure 5:
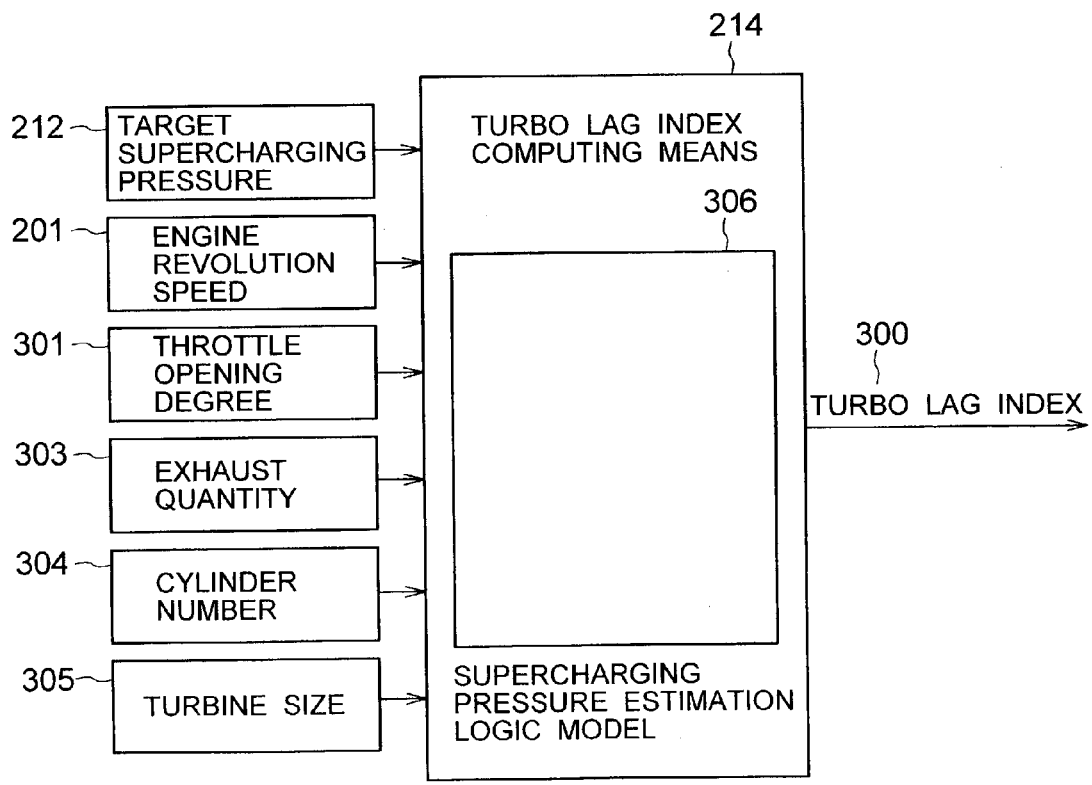
FIG. 5 is a view showing contents of turbo lag index computing means according to a third embodiment.

Now, a third embodiment according to the present invention will be illustrated in FIG. 5. In this embodiment, the above-described turbo lag index 300 is determined using a supercharging pressure estimation logic model 306 with respect to a supercharging pressure of a turbo engine. The supercharging pressure estimation logic model 306 is built in consideration of parameters including geometric parameters, such as a cylinder number 304, an exhaust quantity (air volume displacement) 303, and a turbine size 305, as well as parameters with respect to combustion, such as an air-fuel ratio, ignition timing, and valve timing, so that the turbo lag index 300 is calculated by inputting parameters for a driving state, typically including a throttle opening degree 301. In this way, not only the supercharged pressure sensor 104 used in the second embodiment, but also an adaptability test required for creating the turbo lag index computing map 302 which is essential for the third embodiment are eliminated, so that reduction in cost and process numbers can be achieved.

Figure 6:
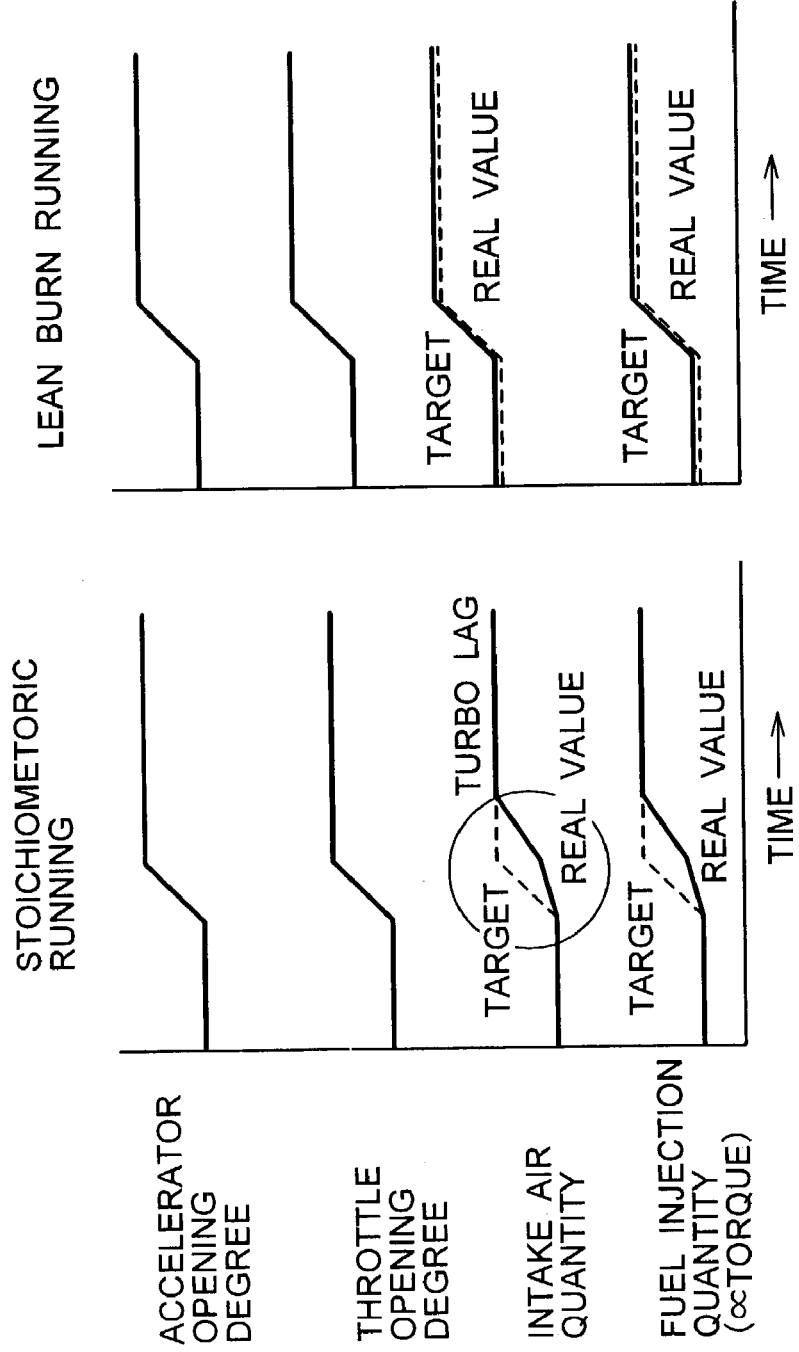
FIG. 6 is a view showing behaviors of parameters associated with a torque in pushing down an accelerator pedal according to a forth embodiment.

Now, a fourth embodiment according to the present invention will be described in reference to FIGS. 6 to 8. FIG. 6 illustrates and compares behaviors of parameters for driveabilities in stoichiometric running and in lean-burn running when the accelerator is operated under the low revolution and low load area. In stoichiometric running, a turbo lag occurs due to a low revolution and low load area, so that an initial rise in torque is slow because of the fuel correction in occurrence of the turbo lag. On the other hand, in lean-burn running, because a ratio of an intake air quantity to a fuel injection quantity is large and an exhaust gas quantity is also large, a turbine revolution number remains high even in the low revolution and low load area, so that the turbo lag is small and the fuel correction quantity can be small to obtain a preferable torque characteristic. Thus, the torque characteristic with respect to an accelerator varies depending on drive modes, which makes a driver feel uncomfortable.

For solving this problem, occurrence of a turbo lag is predicted in order to perform a throttle control so as to compensate the turbo lag in the stoichiometric running, and a normal throttle control is performed in the lean-burn running. This causes a difference between the torque characteristics in the stoichiometric running and the lean-burn running to be small, so that a preferable driveability can be obtained. It is contemplated that as a specific content for the throttle control in the above-described stoichiometric running, for example, a delay of an air quantity due to the turbo lag is approximated to a primary delay and compensation to the primary delay is performed using a differentiator. Alternatively, a real air quantity may be detected to perform a feedback control in which a throttle opening degree is determined in reference to a deviation between the real and target air quantities.

Figure 7:
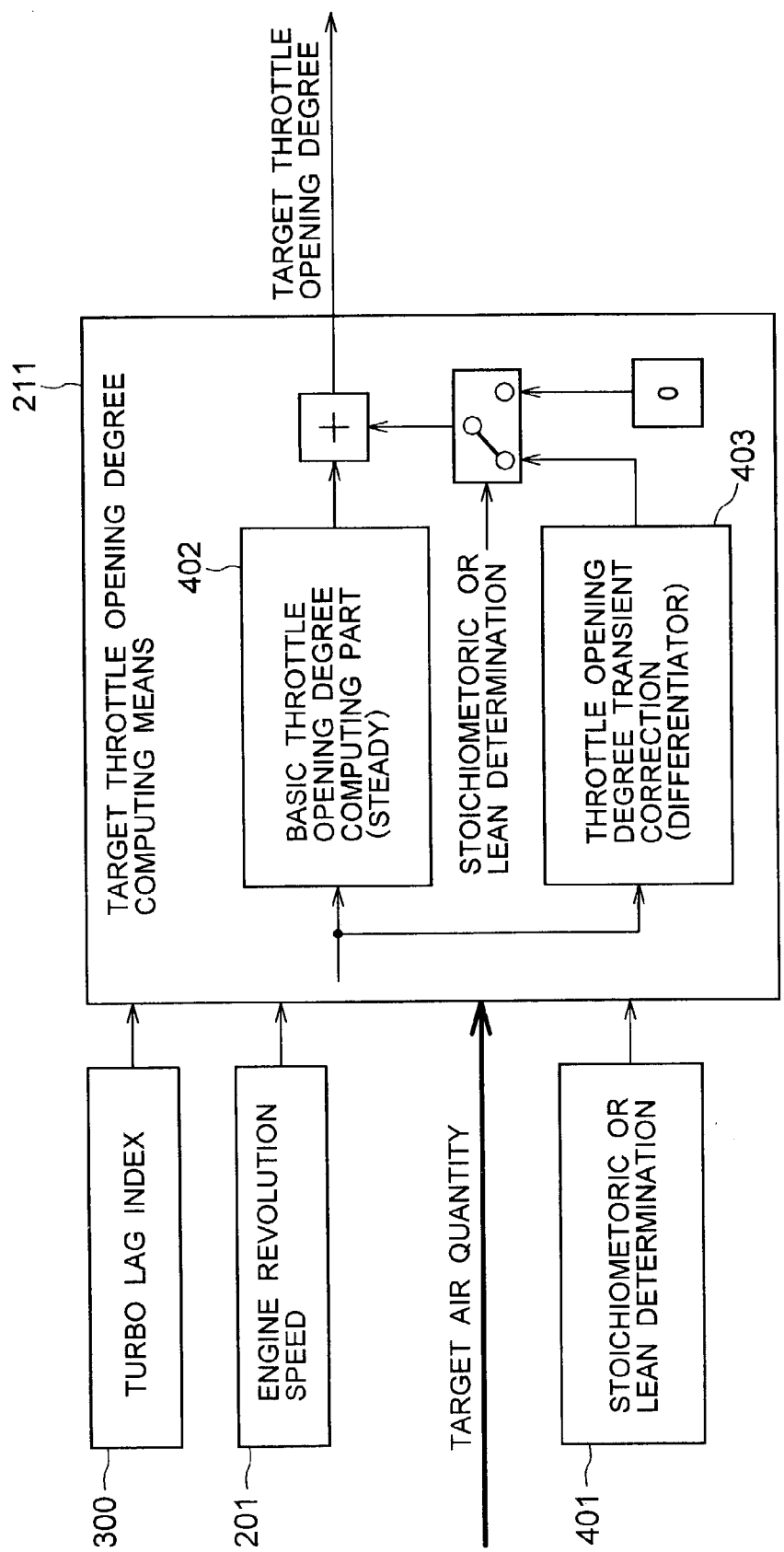
FIG. 7 is a view showing behaviors of parameters associated with a torque variation in switching the burning according to the forth embodiment.

The target throttle opening degree computing means 211 incorporating this logic will be illustrated in FIG. 7. In the computing means, in addition to a target air quantity, a target supercharging pressure, and an engine revolution speed, stoichiometric or lean determination 401 is input as an input. A throttle opening degree computing part consists of a base throttle opening degree computing part 402 which calculates a target throttle opening degree required to obtain the target air quantity and the target supercharging pressure in a steady state, and a throttle opening degree transient time correction part 403 having a function as a differentiator for compensating a delay of the air quantity due to a turbo lag. A gain of the above-described differentiator is dependent on a turbo lag index 300, and set such that if a value of the turbo lag index 300 is small, the gain is increased, while if the value of the turbo lag index 300 is close to 1, the gain is decreased to compensate the turbo lag.

Although in the lean determination, the throttle opening degree is computed only by the base throttle opening degree computing part 402, in the stoichiometric determination, a value of the throttle opening degree transient time correction part 403 is added to the base throttle opening degree computing part 402 to obtain a target throttle opening degree.

Figure 8:
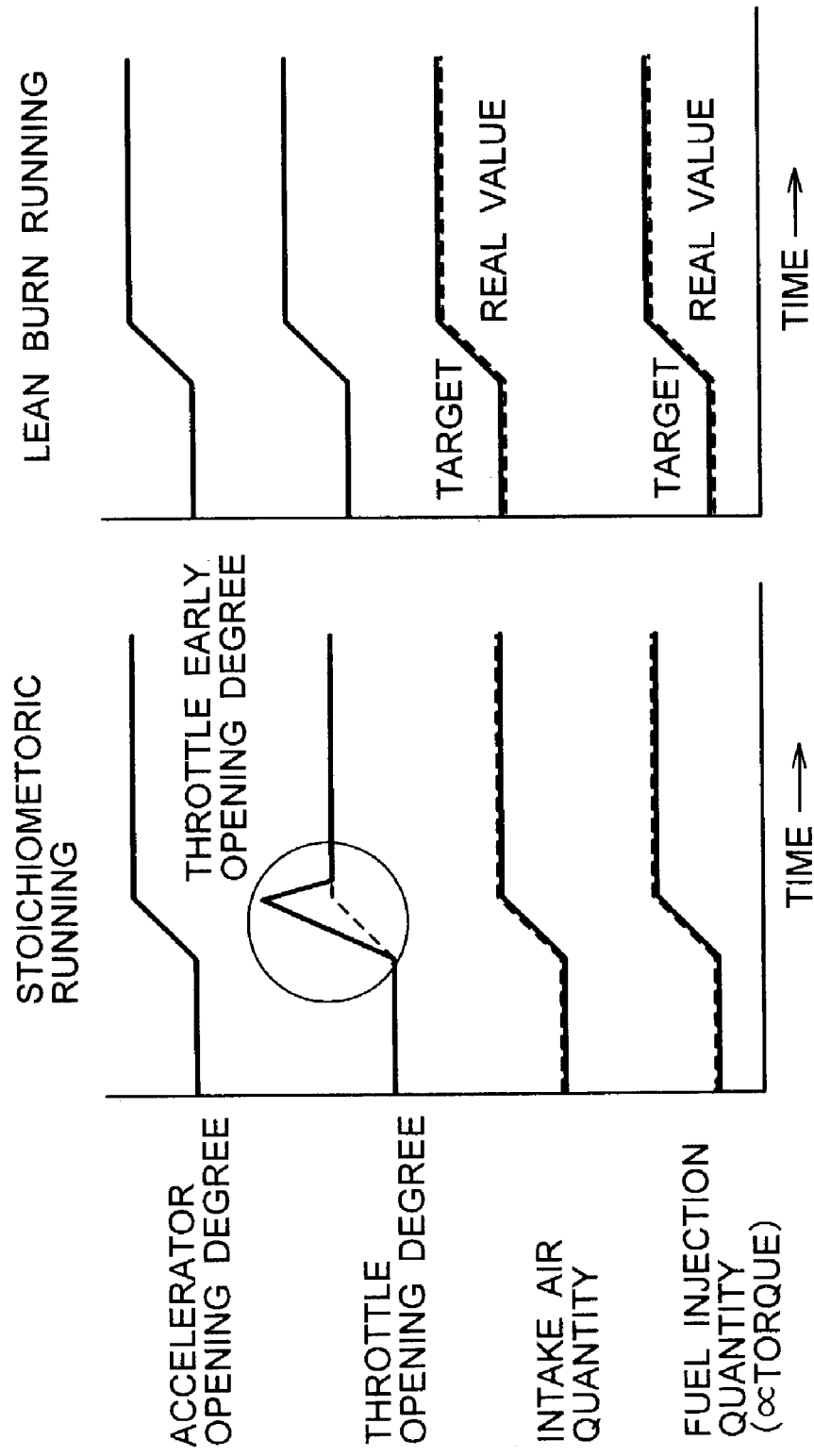
FIG. 8 is a view showing contents of target throttle opening computing means according to the forth embodiment.

The result in the case of employing the target throttle opening degree computing means 211 will be shown in FIG. 8. According to the above-described logic, in stoichiometric running, the so-called early opening of the throttle is performed so as to compensate a delay of an intake air due to a turbo lag by the effect of the throttle opening degree transient time correction part (the differentiator). This causes a real air quantity to be close to a target air quantity, thereby solving the problem that a torque characteristic in accelerator pushing-down varies between in stoichiometric running and in lean running.

In addition, the problem is a common problem not only for the fuel leading torque-based control but also for the air leading torque-based control. Because the logic can also be employed in the air leading torque-based control, the problem that a torque characteristic in accelerator pushing-down varies between in stoichiometric running and in lean running can be solved by employing the logic.

Figure 9:
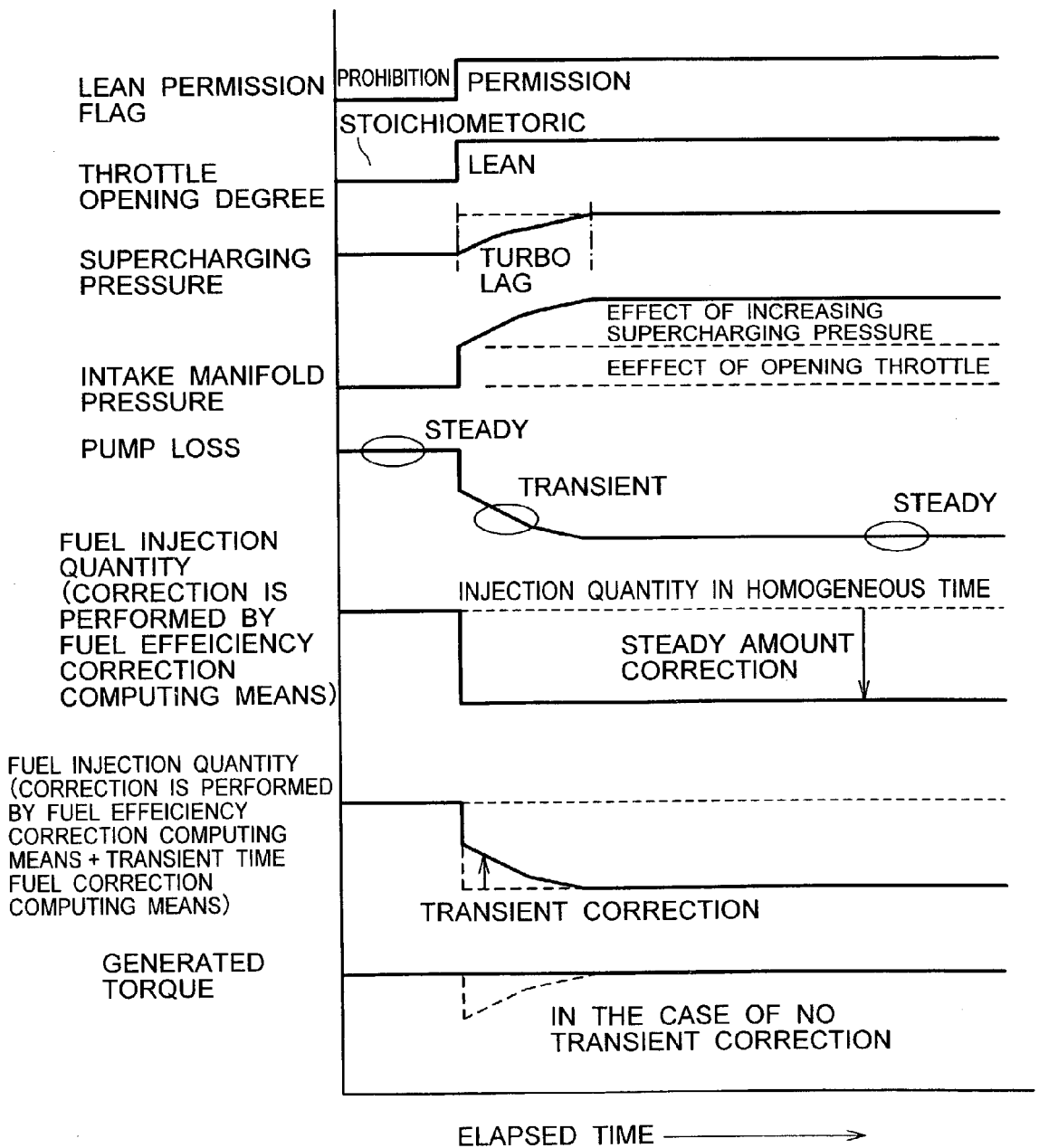
FIG. 9 is a view showing behaviors of parameters associated with a torque in switching the burning according to a fifth embodiment.

Now, a fifth embodiment according to the present invention will be described in reference to FIGS. 2 and 9. The embodiment describes control contents in switching between the stoichiometric burning and the lean-burning. A factor for enhancing fuel consumption in lean running is reduction in a pump loss, and an air intake pipe internal pressure is an index indirectly indicating the pump loss. In the case of a natural air intake engine, the air intake pipe internal pressure is dependent on a throttle opening degree and an EGR ratio, while in the case of a turbo engine, it is also dependent on a supercharging pressure in addition to the throttle opening degree and the EGR ratio. As the air intake pipe internal pressure (an absolute pressure) becomes higher, the pump loss is reduced and thus an shaft output of the engine under a condition of the same fuel injection quantity is increased. Thus, in order to achieve the same torque in the state that the air intake pipe internal pressure varies, it is necessary to regulate the fuel injection quantity in accordance with the air intake pipe internal pressure, and thus correction based on this principle has been performed in the fuel efficiency correction computing means 207 in FIG. 2 described above. However, this computing means performs steady correction and requires transient correction in a transient state that the air intake pipe internal pressure gradually varies due to the turbo lag which is unique to the turbo engine. In this embodiment, the fuel efficiency correction computing means 207 is used for the steady correction, and the above-described transient time fuel correction quantity computing means 209 is used for the transient correction in order to address the requirement. A specific fuel correction method will be described in reference to FIG. 9. FIG. 9 illustrates behaviors of parameters associated with a torque variation in burning-switching, in the case of switching between stoichiometric burning and lean-burning by this control system. The burning (combustion) is switched from the stoichiometric burning to the lean-burning by setting a lean permission flag, and in the switching, the throttle is opened in steps to increase an intake air quantity and a turbine revolution number is also increased with increase in the exhaust gas quantity so that a supercharging pressure is increased. However, a series of operations from a point of time at which the throttle is opened to a point of time at which the supercharging pressure converges to its target value requires some time due to inertial of the above-described turbine 116, thereby the time is observed as a turbo lag. An air intake pipe internal pressure in the period rapidly increases to a certain value just after the throttle is opened, and then slowly increases with rise of supercharging to a steady value. Therefore, the pump loss associated therewith behaves oppositely, that is, the pump loss rapidly decreases to a certain value just after the throttle is opened, and then slowly decreases with the rise of the supercharging to a steady value. To address the change, in the embodiment, a fuel correction in consideration of the pump loss steady value is applied by the above-described fuel efficiency correction computing means, and a pump loss transient change due to the turbo lag is estimated in the above-described transient time fuel correction quantity computing means 209 on the basis of a turbo lag index 300 computed by the turbo lag index computing means 214 and then the corresponding fuel correction is performed to prevent the torque variation when switching combustion state of the turbo engine.

Figure 10:
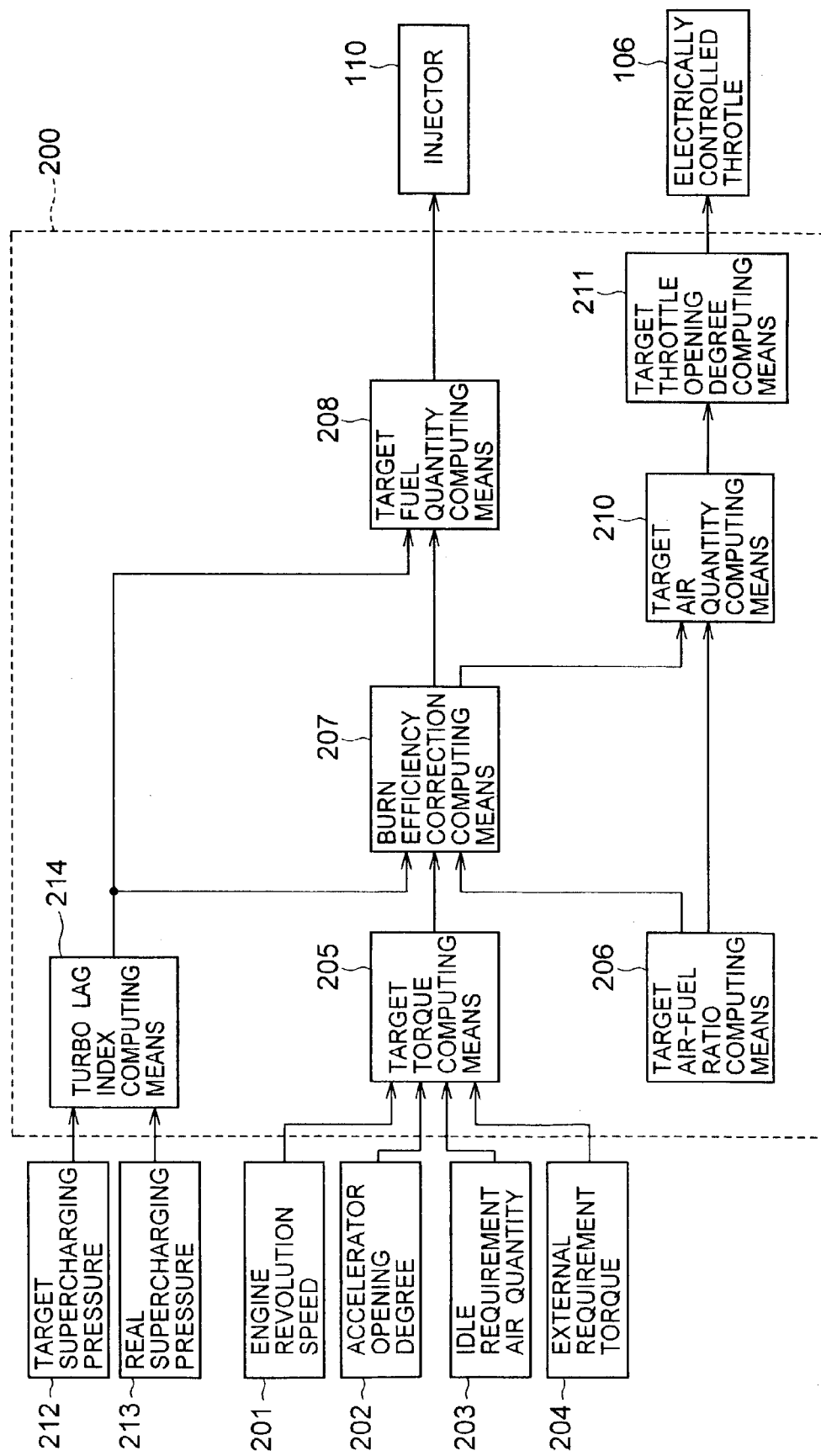
FIG. 10 is a control block diagram of a fuel leading type of torque-based control for a turbo engine.

Although in the above-described embodiments, fuel correction computations in acceleration and in burning-switching is performed in the transient time fuel correction quantity computing means 209 which is modularized, the fuel correction computation may be directly performed in the target fuel quantity computing means 208 or the fuel efficiency correction computing means 207 as shown in FIG. 10.

Figure 11:
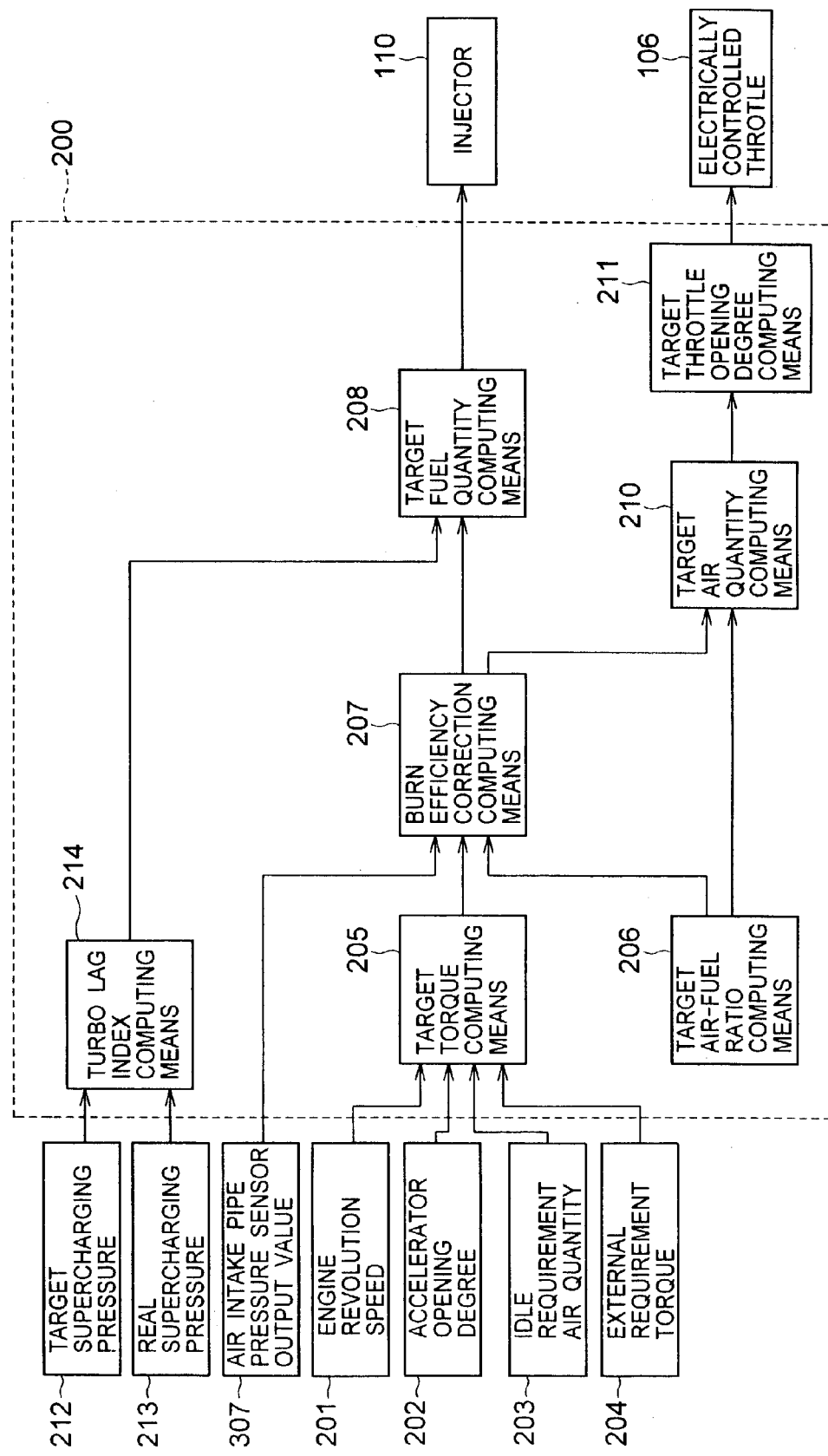
FIG. 11 is a control block diagram of a fuel leading type of torque-based control for a turbo engine.

In addition, a fuel correction accuracy when switching the burning-states can further be increased by attaching an air intake pipe pressure sensor in the intake manifold 107 and using an air intake pipe pressure sensor output value 307 to estimate a pump loss transient change in the fuel efficiency correction computing means 207 as shown in FIG. 11.

Further, a torque variation generated in switching between stoichiometric running and lean running is a common problem not only for the fuel leading torque-based control but also for the air leading torque-based control. Therefore, by applying this logic in which a pump loss transient change amount due to a turbo lag is estimated to perform a fuel correction, an effect of improving the torque variation is also expected for the air leading torque-based control.

As described above, according to the present invention, a torque variation, a change in torque characteristics, exhaust deterioration, or the like in a transient time, which occur due to a turbo lag, can be prevented in a system in which a torque-based control is employed in a direct injection engine with a turbocharger and switching between stoichiometric running and lean-burn running can be performed in accordance with the running states.

Although some embodiments have been described above, it is apparent to those skilled in the art that the present invention is not limited to these embodiments and various changes and modifications can be done in the spirit of the present invention and the scope of the appended claims.

What is claimed is:

1. A control apparatus of an engine of a turbocharged lean-burn engine, which determines at least one of a target opening degree of a throttle valve and a target fuel injection quantity of a fuel injection valve on the basis of at least one of a target engine torque and a target air-fuel ratio, wherein the fuel control apparatus is adapted to correct, during transient running status in which an opening degree of said throttle is varied, a fuel injection quantity of said fuel injection valve on the basis of at least one of supercharged pressure information and air intake pipe pressure information, characterized in that said transient running status corresponds to a status at an acceleration time, and a base fuel injection quantity is corrected, during the status, so that an air-fuel ratio is constant.

2. The control apparatus of an engine of a turbocharged lean-burn engine, which determines at least one of a target opening degree of a throttle valve and a target fuel injection quantity of a fuel injection valve on the basis of at least one of a target engine torque and a target air-fuel ratio, wherein the fuel control apparatus is adapted to correct, during transient running status in which an opening degree of said throttle is varied, a fuel injection quantity of said fuel injection valve on the basis of at least one of supercharged pressure information and air intake pipe pressure information, characterized in that a control which determines at least one of the target opening degree of the throttle valve and the target fuel injection quantity of the fuel injection valve so as to satisfy at least one of said target engine torque and said target air-fuel ratio is a fuel leading type of torque-based control, and that the fuel injection quantity is corrected, in a time of transition in which a supercharging delay is generated, so that the air-fuel ratio is constant.

3. The control apparatus of an engine according to claim 2, characterized in that a supercharging delay of said turbocharger is quantified on the basis of at least one of the supercharged pressure information and the air intake pipe pressure information which are obtained directly or indirectly, so as to perform a supercharging delay correction of an intake air quantity or the fuel injection quantity on the basis of the quantified value.

4. The control apparatus of an engine according to claim 3, characterized in that the apparatus is capable of switching between lean-burn running and normal running, and that said supercharging delay correction of the intake air quantity is performed, in a time of transition during the normal running in which the supercharging delay is generated, so as to obtain a torque characteristic equivalent to that in the lean-burn running.

5. The control apparatus of an engine according to claim 3, characterized in that said supercharging delay correction of the intake air quantity is achieved by opening the throttle earlier valve for a phase lead compensation in a computing logic of the opening degree of said throttle valve.

6. The control apparatus according to claim 2, characterized in that said supercharged pressure information is measured by using a supercharged pressure sensor attached to an air intake pipe, or estimated by searching a map in which an engine revolution speed and a throttle opening degree are used as arguments.

7. The control apparatus of an engine of a turbocharged lean-burn engine, which determines at least one of a target opening degree of a throttle valve and a target fuel injection quantity of a fuel injection valve on the basis of at least one of a target engine torque and a target air-fuel ratio, wherein the fuel control apparatus is adapted to correct, during transient running status in which an opening degree of said throttle is varied, a fuel injection quantity of said fuel injection valve on the basis of at least one of supercharged pressure information and air intake pipe pressure information, characterized in that said transient running status corresponds to a running status in which the air-fuel ratio shifts from a stoichiometric or rich area to a lean area, and a base fuel injection quantity is corrected on the basis of a pump loss change estimated in the status.

8. A control apparatus of a turbocharger type of supercharged engine, controlling the engine by so-called air leading engine control, which apparatus calculates a target engine torque and a target fuel injection quantity corresponding thereto on the basis of an accelerator opening degree and an engine revolution speed, determines an appropriate throttle opening degree in consideration of said target fuel injection quantity and a target air-fuel ratio in order to achieve the target engine torque and the target fuel injection quantity, and after measuring a taken air quantity in accordance with the throttle opening degree, determines a base fuel injection quantity on the basis of the measured air quantity and the target air-fuel ratio to obtain a desired engine torque, characterized in that, during a transient period in which an air-fuel ratio shifts from a stoichiometric or rich area to a lean area, said base fuel injection quantity is corrected in accordance with a pump loss change estimated on the basis of supercharged pressure information or air intake pipe pressure information which are obtained directly or indirectly.

9. The control apparatus of an engine according to claim 8, characterized in that said supercharged pressure information is measured by using a supercharged pressure sensor, attached to an air intake pipe, or estimated by searching a map in which an engine revolution speed and a throttle opening degree are used as arguments.

10. A control unit of an internal combustion engine, to which a throttle opening degree signal is input, and from which a fuel injection quantity signal is output, wherein a supercharged pressure signal or an air intake pipe pressure signal is further input to the control unit, and the fuel injection quantity signal is varied so that the air-fuel ratio is maintained constant on the basis of the supercharged pressure signal or the air intake pipe pressure signal during an acceleration state in which the throttle opening degree signal is varied.

11. A control unit of an internal combustion engine, to which a signal concerning an air-fuel ratio is input, and from which a fuel injection quantity signal is output, wherein a supercharged pressure signal or an air intake pipe pressure signal is further input to the control unit, so that the fuel injection quantity signal is varied in accordance with a pump loss change estimated on the basis of the supercharged pressure signal or the air intake pipe pressure signal during a transient state in which the air-fuel ratio signal is varied from a stoichiometric or rich state to a lean state.

12. A method for controlling a fuel precedence controlled turbocharger type of supercharged engine, in which a target fuel injection quantity of a fuel injection valve is determined so as to satisfy at least one of a target engine torque and a target air-fuel ratio, including the steps of:

correcting a fuel injection quantity on the basis of supercharged pressure information or air intake pipe pressure information during a throttle opening degree is varied; and correcting the fuel injection quantity, in a time of transition in which supercharging delay is generated, so that an air-fuel ratio is constant.

13. A method for controlling an air precedence controlled turbocharger type of supercharged engine, in which a target fuel injection quantity of a fuel injection valve is determined so as to satisfy at least one of a target engine torque and a target air-fuel ratio, including the step of correcting a fuel injection quantity in accordance with a pump loss change estimated on the basis of supercharged pressure information or air intake pipe pressure information which obtained directly or indirectly during a transient period in which an air-fuel ratio shifts from a stoichiometric or rich area to a lean area.

* * * * *